(No Model.) 5 Sheets—Sheet 2.
W. B. HOHENSHELL & E. H. OVERHOLT.
TYPE WRITING MACHINE.
No. 444,636. Patented Jan. 13, 1891.

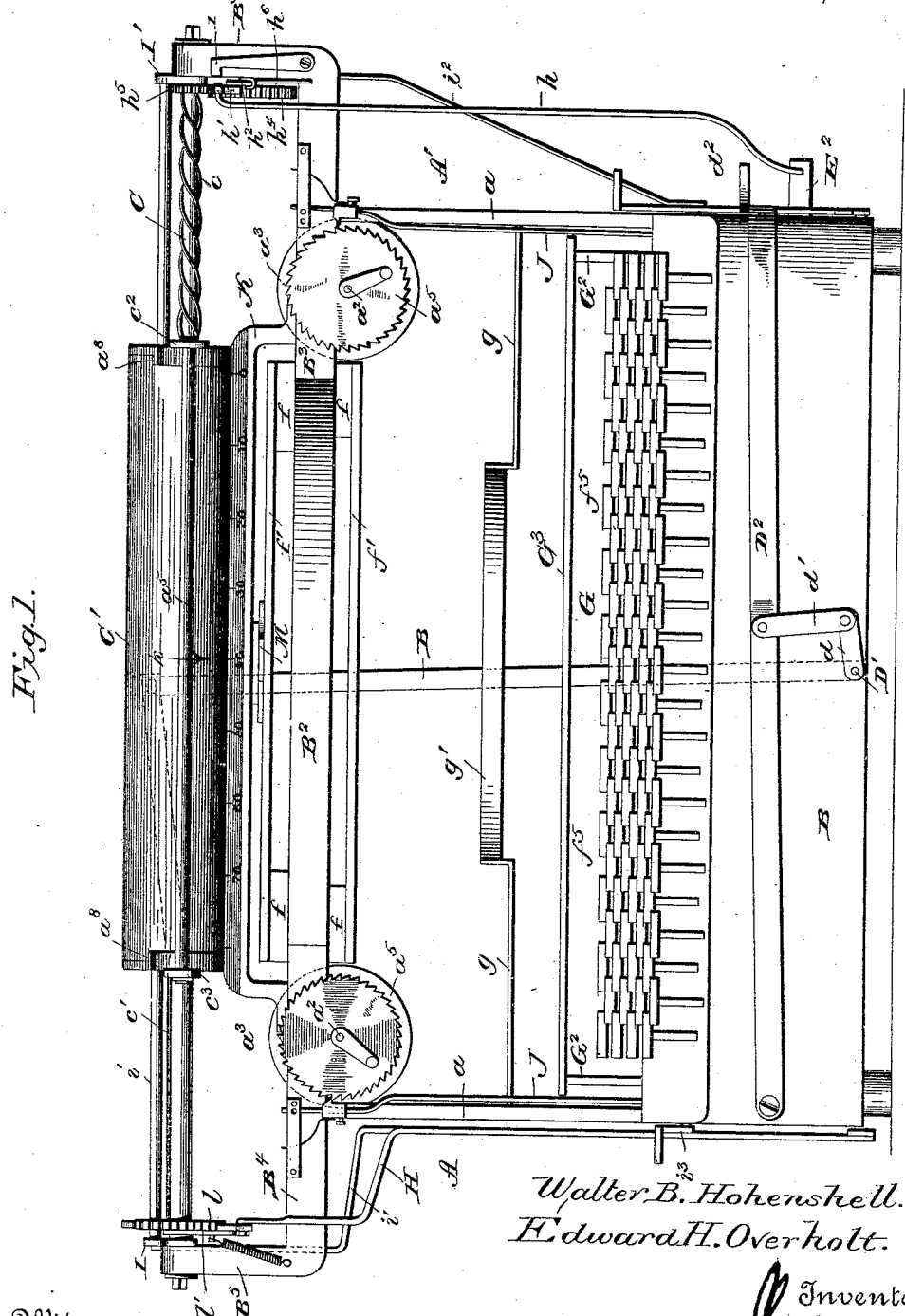

Witnesses
Walter B. Hohenshell.
Edward H. Overholt.
Inventors
Attorney (No Model.) 5 Sheets—Sheet 3.
W. B. HOHENSHELL & E. H. OVERHOLT.
TYPE WRITING MACHINE.
No. 444,636. Patented Jan. 13, 1891.
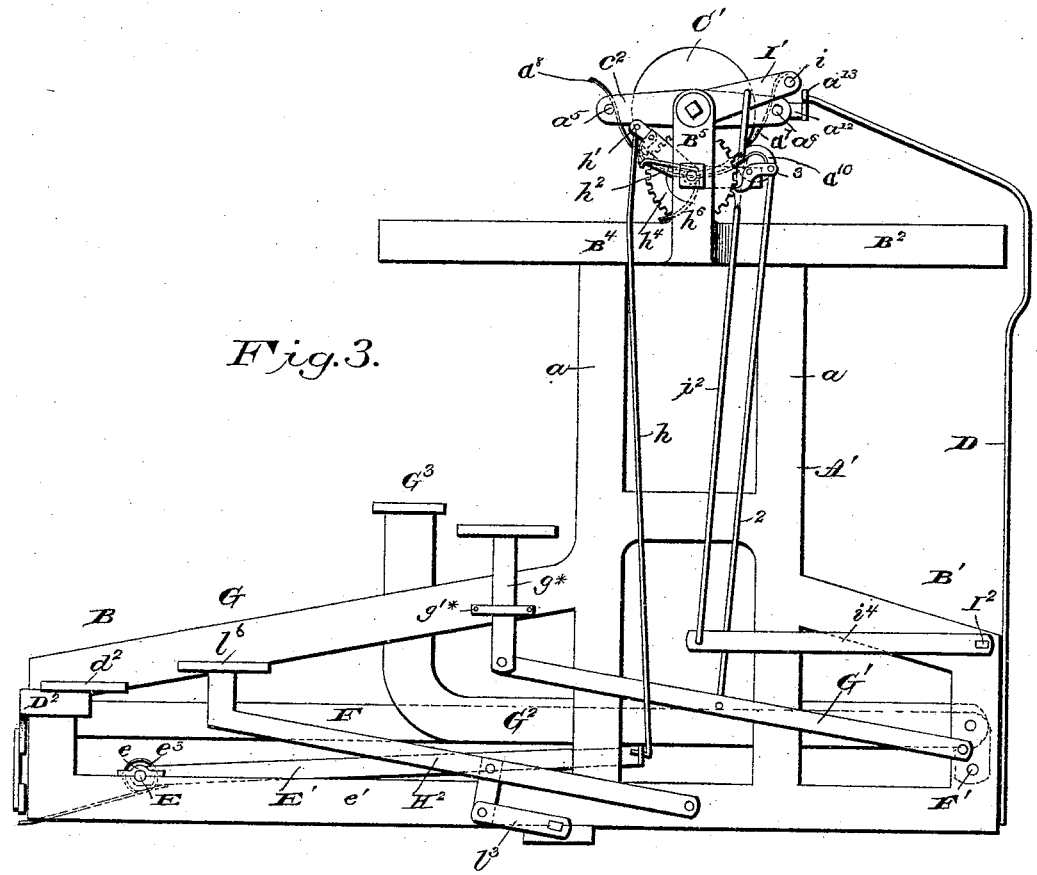
Fig. 3.
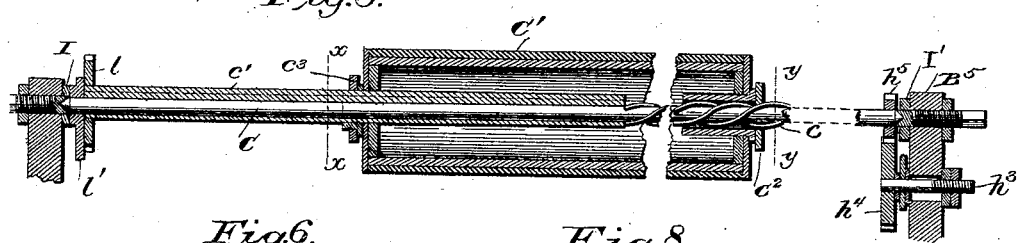
Fig. 5.
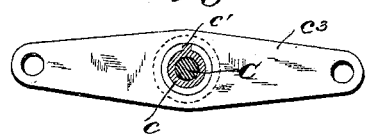
Fig. 6.
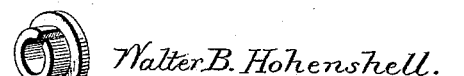
Fig. 8.
Walter B. Hohenshell.
Edward H. Overholt.
Inventors
Witnesses (No Model.) 5 Sheets—Sheet 4.
W. B. HOHENSHELL & E. H. OVERHOLT.
TYPE WRITING MACHINE.

No. 444,636. Patented Jan. 13, 1891.

Witnesses
L. S. Elliott,
W. Johnson.

Walter B. Hohenshell
Edward H. Overholt.
Inventors

Attorney (No Model.) 5 Sheets—Sheet 5.
W. B. HOHENSHELL & E. H. OVERHOLT.
TYPE WRITING MACHINE.
No. 444,636. Patented Jan. 13, 1891.
Fig. 10.
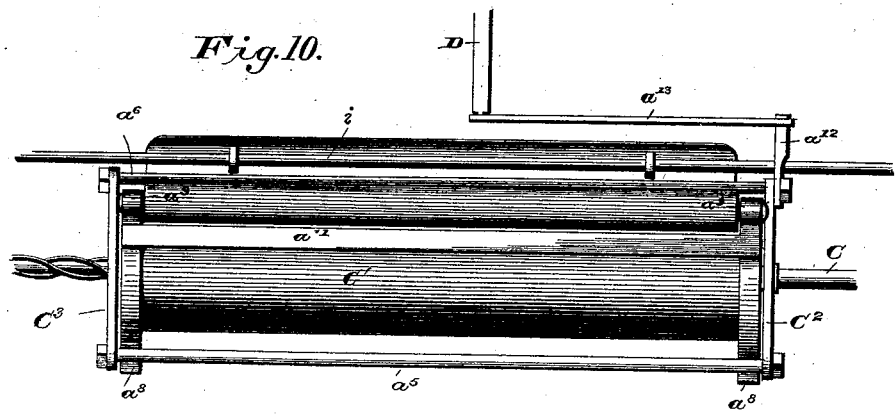
Fig. 11.
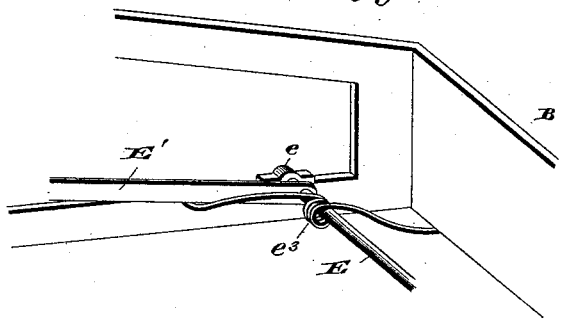
Fig. 12.
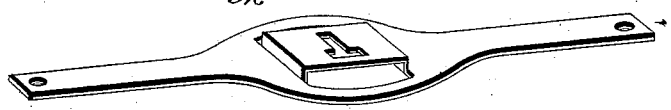
Walter B. Hohenshell.
and
Edward H. Overholt.
Inventor
Witnesses
Attorney

UNITED STATES PATENT OFFICE.

WALTER B. HOHENSHELL AND EDWARD H. OVERHOLT, OF STREATOR, ILLINOIS.

TYPE-WRITING MACHINE.

SPECIFICATION forming part of Letters Patent No. 444,636, dated January 13, 1891.

Application filed June 20, 1890. Serial No. 356,152. (No model.)

*To all whom it may concern:*

Be it known that we, WALTER B. HOHENSHELL and EDWARD H. OVERHOLT, citizens of the United States of America, residing at Streator, in the county of La Salle and State of Illinois, have invented certain new and useful Improvements in Type-Writing Machines; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to type-writing machines; and it consists in the improvements hereinafter described, whereby a series of type-bars carry compound and single impression characters and the carriage fed for a distance corresponding with the width of the compound character.

The invention further consists in mechanism for exposing the paper-cylinder for feeding and reversing the movement of the carriage for line-spacing and for feeding the ribbon.

The invention also relates to certain details of construction and combination of parts, as will be hereinafter fully set forth.

Figure 2:
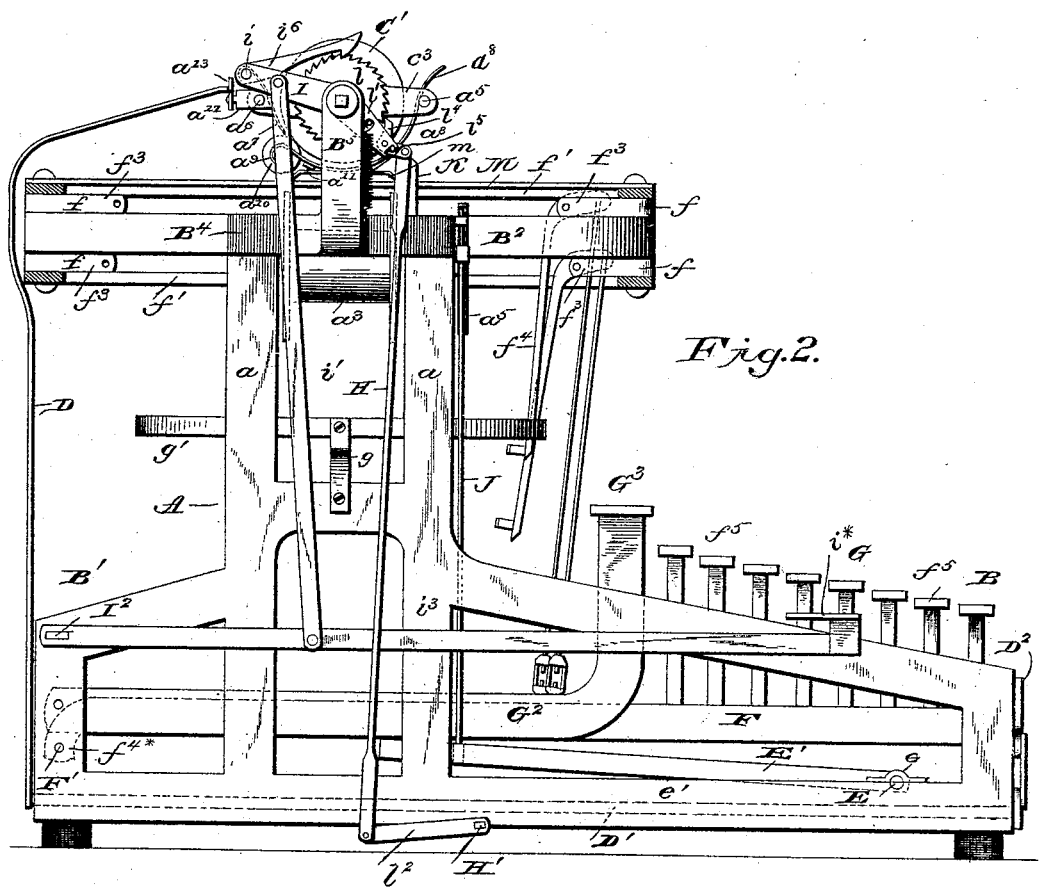
Figure 7:
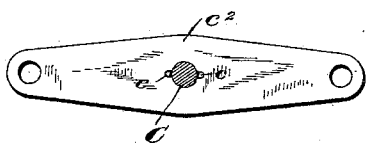
Figure 9:
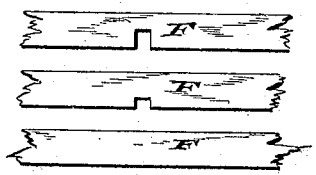
Figure 1:
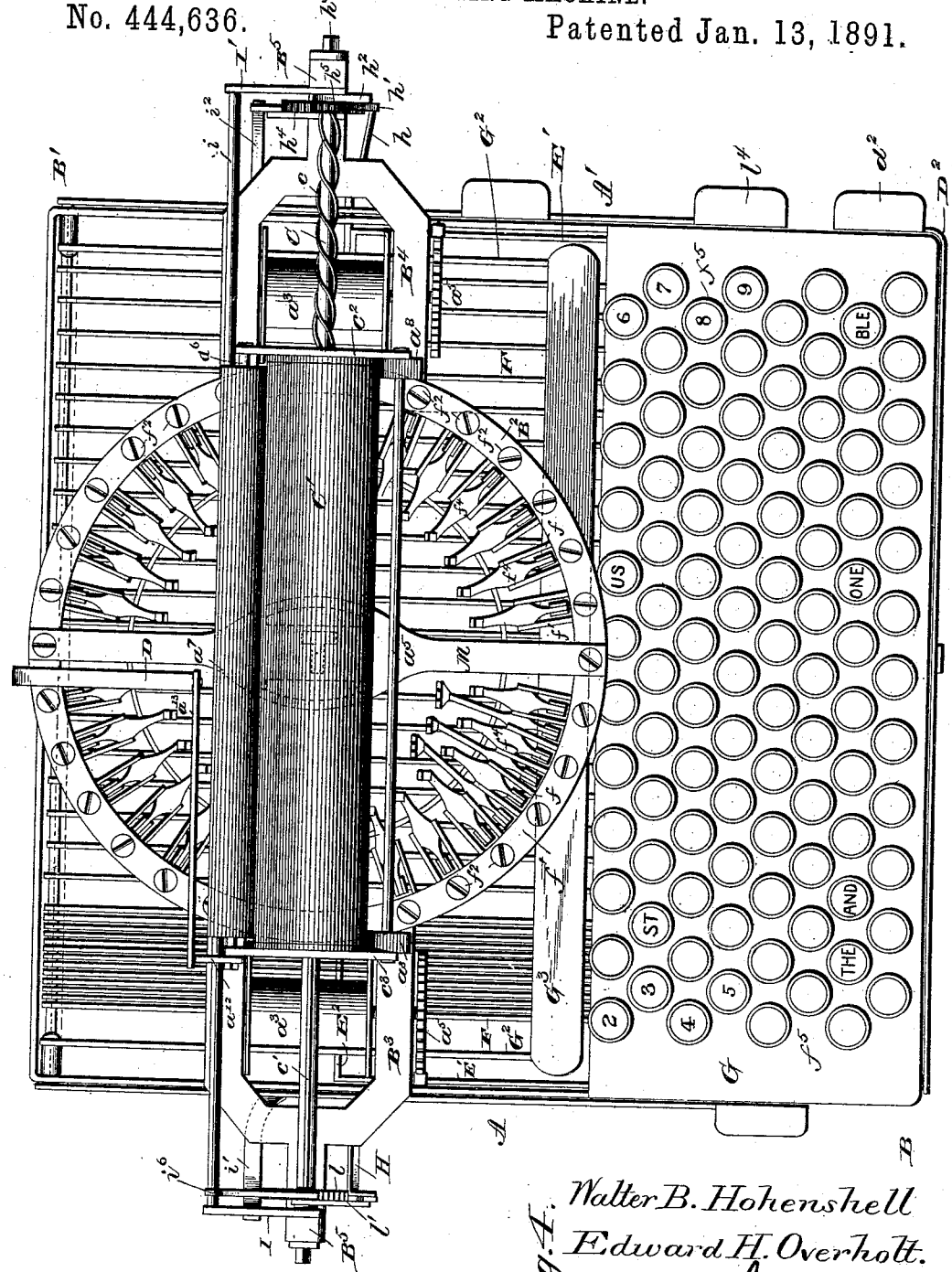

In the accompanying drawings, Figure 1 is a front view of a type-writer embodying our improvements. Fig. 2 is an end view of the same; Fig. 3, a similar view looking at the other side of the machine. Fig. 4 is a plan view of the machine. Fig. 5 is a detail sectional view of the cylinder and its bearings. Fig. 6 is a section on the line $x$ $x$ of Fig. 5. Fig. 7 is a section on the line $y$ $y$ of Fig. 5. Fig. 8 is a detail view of the collar. Fig. 9 is a detail view of portions of several of the type-levers and illustrating their capacity for depressing the frame to a greater or less extent. Fig. 10 is a detail view looking at the under side of the paper-carriage and showing clearly the connection and arrangement of several adjacently-located parts. Fig. 11 is a detail view illustrating the arrangement and connection of spring for holding the frame vibrated by the key-levers in an elevated position. Fig. 12 is a detail view of the ribbon-support.

The main frame of the machine consists of sides A A', and front and rear B B', the former supporting between them the annular section $B^2$, carrying the pivoted type-bars. This section $B^2$ comprises the central circular portion and diametrically-located horizontal loops $B^3$ $B^4$, each carrying at its outer side a vertical bent arm $B^5$.

The under side of each loop $B^3$ $B^4$ is provided with bearings for a rod $a^2$, upon which and within the opening of the loop is mounted a flanged spool $a^3$, upon which the ink-ribbon is adapted to wind and unwind, as will be apparent; also on each rod $a^2$ and adjacent to the front of each loop is mounted a ratchet-wheel $a^5$, designed to be rotated intermittently by a pawl and connections, to be hereinafter explained.

A transverse shaft C bears at one end in one of the arms $B^4$ $B^5$, and is provided with a spiral threaded rib $c$, extending for a portion of its length, while the balance of said rod passes through a sleeve provided with a spline or feather $c'$. Upon the shaft C is mounted and adapted to move the paper-carriage consisting of horizontal end plates $c^2$ $c^3$, each centrally perforated, the perforation in the plate $c^2$ being of a form to adapt it to conform to the threaded character of the shaft, while the plate $c^3$ is provided with a circular perforation. The opening in the plate $c^3$ contains a bushing split for the passage of the feathered shaft, but permitting the plate to turn on said bushing. The front ends of said plates are connected together by means of a transverse tie-rod $a^5$, while the rear ends are correspondingly connected by a rod $a^6$. A paper-cylinder C' is mounted upon the shaft between the plates. The rear rod $a^6$ has secured thereto a curved guard $a^7$, the forward portion of which depends down beneath the cylinder, while the rear portion curves up rearwardly, and is provided on its under side with loops.

Secured to the front rod $a^5$ adjacent to each plate is a curved spring-arm $a^8$, the forward ends of which project beyond the rod, and are bent horizontally to assist in guiding the paper beneath the cylinder, while the rear portions of said arms are curved downward beneath said cylinder and terminate in loops $a^9$, in which bear the journals of a transverse roller $a^{10}$, a strip $a^{11}$ connecting and bracing said arms immediately in advance of said roller. It will be realized that the strip and roller are located at the termination of the lower front edge of the guard.

The plate $c^3$ has attached thereto a short projection $a^{12}$, which projects rearwardly, and to the end of which is pivotally attached a link $a^{13}$, extending horizontally parallel with the rear rod $a^6$, and the other end of which has a circular recess in which bears the circular enlargement on the upper end of a vertical lever D, so that said lever may be vibrated to one side of its vertical axis and operate the link and carriage without bending or straining the parts. The upper portion of the standard is curved forward, so as to extend over the rear of the curved annular type-bar section, and the lower part of said standard is rigidly connected to the rear end of a longitudinal shaft D', bearing in the front and rear sections of the main frame, and the front end of which projects beyond the front for the attachment thereto of a crank-arm $d$, connected by a short link $d'$ to a transverse bar $D^2$, extending parallel with the front of the case and pivoted at one end to said front adjacent to one side of the machine, the other end being bent around the corner of the machine, where it carries a knob or plate $d^2$ to facilitate its being depressed.

Boxes $e\ e$ on the lower bars $e'$ of the sides of the frame act as bearings for the ends of a shaft E, transversely within the lower part of the frame and having attached thereto the forward ends of longitudinal bars E', connected together at the rear ends by transverse bar $E^2$, one end of which projects a short distance through the open portion of one of the sides of the frame. These bars E' $E^2$ constitute a vibrating frame, the bar $E^2$ of which is normally held in an elevated position by means of a spiral spring $e^3$, coiled around the shaft E, and one end of which bears beneath the front of the main frame, while the other end engages the adjacent side bar E'.

On the ring portion of the type-bar support are the yoke-castings $f$, which are secured in position above or below said ring by means of circular locking-plates $f'$, perforated for a securing-screw $f^2$, passing therethrough, and then through the butt of the casting and into the annular section. The parallel portions $f^3$ of each yoke extend radially within the annular section, and have pivoted between the same the elbow of the bell-crank type-bar $f^4$, the longer portion of which carries the impression-block provided with either single or compound impression character, according to the relative arrangement in the machine. It will be noticed that the type-bars in the upper and lower series are alternately arranged so as not to interfere with their vibrations, and that the lower bars can be of a longer length than those above.

In further explanation of the specific arrangement of type-bars it may be stated that the series of bars with one, two, or more impression characters thereon will, by reason of their different lengths, not be in the way of each other, as the arrangement affords more room without interference between the upper and lower series, and increases the capacity in a given circular.

The short inner portion of each type-bar is connected by a vertical rod to its particular type-lever F below, said type-lever being provided at its rear end with an enlargement $f^{4*}$, perforated for the passage of a transverse rod F', located at the rear of the frame, and upon which said type-levers are hung.

The front portion of the machine is provided with a key-board G, having a series of perforations, in which are located the buttons $f^5$, attached by small vertical rods to the key-levers. These keys, for the sake of convenience, are arranged as shown in Fig. 4, and having the buttons operating the keys carrying the compound letters associated in a manner most convenient for their use.

From each side of the frame and projecting into the machine are two brackets $g\ g$, which support a metallic ring $g'$ a short distance below the annular section to which the type-bars are secured, and said ring serves to limit the vertical drop of the type-bars.

The projecting end of the transverse bar of the inner vibrating frame has connected therewith a vertical rod $h$, which is connected to a pawl $h'$, pivoted to a plate $h^2$, secured on a small stub-shaft $h^3$; also, upon said stub-shaft is a gear-wheel $h^4$, which meshes with a pinion $h^5$, keyed on the carriage-shaft above, so that each time the frame within the machine is vibrated the pawl $h'$ will be in engagement with the gear-wheel $h^4$, and rotate the same and the pinion to a degree proportionate with the degree to which the vibrating frame is depressed. A coiled spring $h^6$, mounted on the stub-shaft, has a free portion in engagement with the plate.

The key-levers all bear upon the transverse bar of the vibrating frame, so as to operate the same each time each lever is depressed. The levers while operating the type-bars having the greatest number of impression characters will, by reason of their having a plain lower edge, depress said vibrating frame to the greatest extent of its movement, so as to rotate the carriage-shaft and move the carriage the greatest distance on the machine. The levers operating the type-bars having the next greater number of characters have shallow notches on their under sides immediately above the transverse bar of the frame so as to not depress the said vibrating frame to the same extent as the levers previously referred to, the slots in the levers increasing in depth as the impression characters decrease in number. It will be seen that the pawl-plate on the stub-shaft is always brought back with its pawl to its first position after the key-lever is released by means of a spring coiled around the said shaft and having its free portion engaging the under side of the plate. A pivoted hook 1 on the front side of the adjacent arm is designed to be moved over to engage said pawl-plate to hold it in a depressed position and prevent its operation and consequent feed of the carriage thereby.

Near the lower rear portion of the side A' is pivotally secured a lever G', which extends forward and operates above the projecting portion of the vibrating frame, and has a small vertical link-arm $g^*$, which plays through and is guided in a loop $g'^*$, secured on the side of the machine adjacent to the upper corner of the bank of keys, and said arm carries a button to enable it to be depressed. A rod 2 connects said lever with a pawl 3, pivoted to a plate hung on the stub-shaft, as shown, such an arrangement securing the reverse movement of the carriage without operating any of the type-bars, and thereby providing a medium for correcting.

Two levers $G^2$ $G^2$ are connected at their rear ends to the inner sides of the machine, and, extending forward to a point adjacent to the inner edge of the key-board, are bent upwardly and connected by a transverse plate $G^3$, which can be conveniently depressed with said levers to operate the vibrating frame and secure the necessary spacing.

The opposite end of the carriage-shaft, which bears in the adjacent arm, has mounted thereon a ratchet-wheel $l$, adjacent to which is hung a pivoted plate $l'$, carrying a pivoted pawl $l^4$, engaging said ratchet-wheel, the plate being held in a downward position by means of a contracting spring $l^5$, attached to said plate and to the base of the arm. A curved vertical lever H is connected to the pawl, and is attached at its lower end to a crank-arm $l^2$, connected to the transverse shaft H', bearing in the base of the machine and projecting at the other side of the same for the attachment thereto of a crank-arm $l^3$, connected by a link to a horizontal bar $H^2$, pivoted at its rear to the side of the machine and extending forward, where it also terminates in a vertical extension and button $l^6$ to secure its depression, so that the carriage-shaft, together with the paper-cylinder, will be revolved to change the line of printing.

Loosely mounted upon the carriage-shaft, adjacent to the bearing-arms of the same, are two rearwardly-extending plates I I', connected together at their outer ends by a rod $i$ engaging the loops in the rear of the paper-guard. Depending rods $i'$ $i^2$ are connected to said plates I I' and depend therefrom to connect at their lower ends, respectively, with a lever $i^3$ and an arm $i^4$, respectively connected at their rear ends to the extremities of a transverse shaft $I^2$, bearing in the rear part of the main frame, the lever $i^3$ extending adjacent to the key-bank and carrying a button $i^5$ to enable it to be depressed, so as to rock the shaft and arm $i^4$ and cause the plates I I' to be moved so as to partially turn the carriage on its shaft and expose the line of writing. A spring-pawl $i^6$, mounted on the rod connecting said plates, bears on the ratchet, so as to prevent the rotation of the latter and the paper-cylinder when the carriage is partially turned, as stated.

Vertical rods J are connected to both sides of the vibrating frame, each of which is suitably geared, so that its upper end will engage one of the ratchet-wheels of the ribbon-spools above and intermittently rotate said reels to wind the ribbon thereon as the vibrating frame is operated. The shaft of either reel may be provided with a crank, so as to rewind the ribbon thereon when necessary. The relative position of the rods J is such that they alternately engage with the ratchet-wheels and do not mutually interfere.

A bar K, transversely spanning the front of the central circular portion, has its ends depending for attachment to the central portion of the frame, so that the bar itself will occupy a portion immediately in advance of the upper cylinder, and the front of said bar carries a graduated scale, which indicates the relative position of the printing spaces upon the paper. A pointer $k$ on the front bar of the carriage shows the relative printing-point to which the paper has reached.

In the construction of the type-bars and type and the arrangement of key-board many compound characters adapted to form parts of many words are conveniently disposed, so that the operator may become readily accustomed to depressing a key that will form several letters of the word to be printed at one depression. For instance, in printing the word "shorthand," the combinations would be "sh-or-th-and," thus requiring the depression of but four keys to secure the printing of nine letters. To print the word "anything," but three keys would require to be depressed—to wit, those carrying the compound characters "any-th-ing." Other compositions would be correspondingly secured.

From the foregoing it will be seen that the improvements herein set forth are embodied in a machine that will compare favorably in point of durability and simplicity with any of the commercial type-writing machines.

A ribbon-supporter M longitudinally spans the circular portion $B^2$ and is secured thereon, and the said supporter is provided centrally with a slightly-elevated bridge $m$, connected to the supporter by vertical portions, so as to leave side openings between them beneath the bridge for the passage of the ink-ribbon, and the horizontal portion of the bridge is provided with an opening, which is of the form shown in Fig. 4, to permit either small or extended characters to make impressions through the same, and said opening contracts toward its top to maintain the impressions precise, since, if the character should be slightly out of position, the inclined walls of the opening will deflect it to the desired extent. The T-shaped opening is especially adapted for compound characters where the first letter is an extended one or a capital.

It will be noticed that the pawls $h'$ and 3 are normally out of an engaged position, so that either can be thrown into action without interference from the other.

We claim—

1. The combination, in a type-writing machine, of the type-bars, keys, and intermediate connections, a frame vibrated by the keys, a shaft above the pivotal plane of the key, a paper-carriage mounted thereon, gearing to operate said shaft, a pawl engaging the same, a rod connecting said pawl with the vibrating frame, and a second pawl for reversing said gearing and connected by a rod to a lever moving independent of said vibrating frame, substantially as set forth.

2. The combination, in a type-writing machine, of a series of type-bars carrying single and compound impression characters, the latter extending horizontally to one side of said bars, keys and their levers for operating said bars, a frame vibrated by said key-levers, the latter being notched at their bearing portions to vary the depression of the frame, a shaft above the pivotal plane of the keys, a paper-carriage mounted thereon, gearing on said shaft, a pawl engaging the same, a rod connecting said pawl with the vibrating frame, and a second pawl for reversing said gearing and connected by a rod to a lever moving independent of said vibrating frame, substantially as set forth.

3. The combination, in a type-writing machine constructed and operating substantially as described, of a shaft and a carriage movable thereon, feeding devices, and rearwardly-extending plates hung on said shaft and connected by a rod playing through loops in the carriage, together with lever connections for depressing said rod and plates and thus partially turning said carriage, as specified.

4. The combination, in a type-writing machine constructed and operating substantially as described, of a threaded shaft, a carriage having a nut to move thereon, a pinion on said shaft, a gear-wheel meshing below the same, a plate hung on said gear-wheel shaft and carrying a pawl to engage the same, a spring for holding said plate in an elevated position, and a hook for locking it in a depressed position, as specified.

5. The combination, in a type-writing machine constructed and operating substantially as described, of a shaft and paper-carriage thereon, feeding devices and operating connections, a cylinder and ratchet for rotating the same, a rod and lever for rotating said ratchet, rearwardly-extending plates hung on said carriage-shaft and connected to a rod with which the carriage has a sliding engagement, a lever connecting with said plates to depress the same and tilt the carriage, and a spring-arm bearing upon said ratchet to prevent its movement when the carriage is tilted, as specified.

6. The combination, in a type-writing machine constructed and operating substantially as described, of a shaft and paper-carriage thereon, feeding devices therefor, an arm projecting from the rear of the carriage, a horizontal link, a vertical lever connected by a swivel-joint to said link, a shaft rigidly connected to said lever, and means for turning said shaft to vibrate the lever and transversely move the carriage, as specified.

7. The combination, in a type-writer constructed and operating substantially as described, of a ribbon-supporter M, spanning the circular portion $B^2$ and having an elevated bridge provided with an impression opening, and side openings beneath the same for the passage of the ribbon, as specified.

8. The combination, in a type-writer constructed and operating substantially as described, of the paper-carriage and its cylinder, and feed devices, including gear-wheel $h^4$, of pawls $h'$ and 3, normally out of engagement with the wheel $h^4$, together with connections for alternately throwing said pawls into engagement to differently operate the feed devices, as specified.

In testimony whereof we affix our signatures in presence of two witnesses.

WALTER B. HOHENSHELL.
EDWARD H. OVERHOLT.

Witnesses:
A. G. DICUS,
J. M. HESS.